United States Patent [19]
Yaniger

[11] Patent Number: 6,085,923
[45] Date of Patent: Jul. 11, 2000

[54] COMPOSITE SYNTHETIC STOPPER

[75] Inventor: Stuart Yaniger, Ventura, Calif.

[73] Assignee: Neocork Technologies, Inc., American Canyon, Calif.

[21] Appl. No.: 08/696,326

[22] Filed: Aug. 13, 1996

[51] Int. Cl.[7] ................................................ B65D 39/00
[52] U.S. Cl. ........................... 215/355; 215/362; 524/13; 524/14; 524/513; 521/50
[58] Field of Search .................. 524/13, 14, 513; 521/50; 215/355, 362

[56]  References Cited

U.S. PATENT DOCUMENTS

| | | | |
|---|---|---|---|
| 34,227 | 1/1862 | Ames | 215/364 |
| 229,537 | 7/1880 | Lenglet | 215/364 |
| 281,333 | 7/1883 | Barrett | 215/364 |
| 466,169 | 12/1891 | Hume | 215/364 |
| 512,705 | 1/1894 | Holmes | 215/364 |
| 527,517 | 10/1894 | Varley | 215/364 |
| 573,239 | 12/1896 | Rockwell | 215/364 |
| 706,247 | 8/1902 | Margetts | 215/364 |
| 706,643 | 8/1902 | Blumer | 215/364 |
| 2,463,952 | 3/1949 | Cooke | 117/100 |
| 2,549,404 | 4/1951 | Williams | 215/48 |
| 3,406,127 | 10/1968 | Alexander | 260/2.3 |
| 3,442,411 | 5/1969 | Mahoney | 215/40 |
| 3,549,047 | 12/1970 | King et al. | 161/87 |
| 3,715,047 | 2/1973 | Sado | 215/47 |
| 3,984,022 | 10/1976 | Babiol | 215/355 |
| 4,042,543 | 8/1977 | Strickman et al. | 260/17.4 R |
| 4,091,136 | 5/1978 | O'Brien et al. | 428/141 |
| 4,188,457 | 2/1980 | Throp | 428/452 |
| 4,363,849 | 12/1982 | Paisley et al. | 428/318.8 |
| 4,522,856 | 6/1985 | Paisley et al. | 428/64 |
| 5,269,991 | 12/1993 | Gueret | 264/73 |
| 5,286,790 | 2/1994 | Laughner | 525/67 |
| 5,317,047 | 5/1994 | Sabate et al. | 524/16 |
| 5,480,915 | 1/1996 | Burns | 521/50 |

FOREIGN PATENT DOCUMENTS

| | | |
|---|---|---|
| 0 496 194 A1 | 1/1992 | European Pat. Off. . |
| 1 518 450 | 4/1967 | France . |
| 2 254 486 | 7/1975 | France . |
| 2 501 636 | 9/1982 | France . |
| 2 662 142 | 11/1991 | France . |
| 60-071-643 | 4/1985 | Japan . |
| 60-204-316 | 10/1985 | Japan . |
| 63-307-060 | 12/1988 | Japan . |

OTHER PUBLICATIONS

"Glass Reinforced Plastics" edited by P. Morgan 1955, p. 147.

Ecork "Revolution" brochure, produced by Cortex as, NRF 19 Stendahl, Apr. 1996.

Primary Examiner—James J. Seidleck
Assistant Examiner—U. K. Rajguru
Attorney, Agent, or Firm—Blakely, Sokoloff, Taylo & Zafman

[57]  ABSTRACT

A stopper for use in a substantially cylindrical bottle opening is disclosed. The stopper is made of a synthetic elastomer body with a portion with a substantially cylindrical shape to seal the bottle opening. The elastomer body also contains a fiber portion or a plurality of fiber portions oriented substantially longitudinally in the elastomer body. The synthetic stopper is preferably designed to replace traditional wood bark corks in wine bottles. In one embodiment, the fiber reinforcement is in the form of a porous plug surrounded by an elastomer skin. In another embodiment, fibrous strips are dispersed throughout the stopper structure. The method of producing a stopper for use in a substantially cylindrical bottle opening is also disclosed as is a method of protecting a liquid in a bottle with a fiber reinforced synthetic elastomer stopper.

18 Claims, 3 Drawing Sheets

COMPOSITE SYNTHETIC STOPPER

BACKGROUND OF THE INVENTION

1. Field of the Invention

The invention relates to bottle stoppers and more particularly to synthetic stoppers for use in wine bottles and other similarly packaged products.

2. Background of the Invention

Natural cork is the most common material for making stopper-type bottle closures. The use of cork to finish wine and other food products dates back centuries. Natural cork is a wood product. The disadvantages of the use the natural wood product are well-known. These disadvantages include, inconsistency in structure leading to leakage and premature aging of the bottle contents, susceptibility of the contents to contamination from trichloroanisole (TCA) which gives the bottle contents a musty aroma, and a tendency to dry and crumble with age, storage, or dry environments.

Alternatives to natural cork stoppers have been known for many years. U.S. Pat. No. 466,169 issued to Hume discloses a stopper formed of a strip of textile material, such as canvas, filled with rubber and rolled up in the shape of a tapered stopper. The resulting stopper structure consists of a core of textile material surrounded and enveloped with rubber. U.S. Pat. No. 512,705 issued to Holmes discloses a method of making a cork-like stopper of fiber pulp by pressing the pulp into proper form in suitable molds. The stopper can be used directly from the mold. However, in order to render the stopper water and acid proof, the stopper is dipped in melted paraffin wax.

Synthetic closures have also been developed to remedy the disadvantages associated with natural wood cork. For example, U.S. Pat. No. 281,333 issued to Barrett discloses a method of making a stopper consisting of pressing or forcing suitable plastic material, such as lionite, into a tube in a mold of vulcanite, xylonite, celluloid, or like material. The molded stopper produced is of a plastic material with a skin of vulcanite, xylonite, celluloid, or like material. U.S. Pat. No. 5,480,915 issued to Burns discloses the use of a thermoplastic elastomer and a commercially available blowing agent injection molded to form a porous cork-like structure. U.S. Pat. No. 4,188,457 issued to Throp discloses the use of a foam plastic injection-molded closure made with an ethylene vinyl acetate (EVA) polymer formed with sodium metabisulphite. French Patent No. 1,518,450 issued to Daicel Ltd. describes a closure produced by compressing a mat of thermoplastic fibers to form a porous plug. U.S. Pat. No. 4,042,543 issued to Strickman, et al., describes a stopper that combines a polymer with cork particles. European Patent Application 92100058.4 filed by Fantin on Jan. 9, 1991, and published Jul. 29, 1992, describes a plastic stopper with a cylindrical elastic insert made of granulated cork or a high density plastic material with resilient characteristics, or natural or synthetic rubber.

The difficulty with these prior art structures are numerous. First, the synthetic stoppers are not compatible with conventional cork insertion machinery. A standard wine bottle throat or neck has an inside diameter of approximately 18.5 mm±0.5 mm. Thus, a stopper must have a slightly larger diameter to properly seal the bottle. Cork insertion machinery is used to compress the stopper and insert the stopper into the neck of the bottle. Upon compression in the cork insertion machinery, the cork's diameter is reduced to approximately 15.0 mm diameter. The prior art stoppers cannot withstand the compression of the corking equipment without cutting, creasing, or wrinkling. This is particularly true with those stoppers whose inner density or elasticity is less than their outer density or elasticity. In such cases, the compression machinery overcomes the resistance of the outer walls of the stopper, causing the stopper to cut, crease, or wrinkle. A cut, creased, or wrinkled stopper will not completely expand to its desired shape in the bottle and thus will not properly seal the bottle.

Other difficulties associated with prior art stoppers include a difficulty in extraction of the stopper from the bottle due to poor closure compressibility; poor compressive and sealing properties; and the possibility of extraction of undesirable taste and aromas from plasticizers and other additives or from a chemical reaction between the stopper and the wine. Finally, a significant obstacle to the use of the thermoplastic stoppers is the relatively high cost associated with producing thermoplastic stoppers by a conventional injection molding process.

There is a need for a synthetic stopper that is inert in a wine solution, that is compatible with cork insertion machinery, that seals upon insertion in a bottle, and that retains resiliency against a bottle wall over time. There is also a need for a synthetic stopper whose cost of production is not prohibitive relative to natural wood bark cork. Finally, what is needed is a synthetic stopper with a printable skin whose basic color may resemble that of natural wood bark cork.

SUMMARY OF THE INVENTION

The invention relates to a stopper for use in a substantially cylindrical bottle opening. The stopper is made of a synthetic elastomer body having a portion with a substantially cylindrical shape to seal the bottle opening. The elastomer body contains a fiber portion extending substantially longitudinally through the elastomer body. The invention also relates to a method of making the stopper and to a method of protecting liquid in a bottle using the stopper.

The stopper is inert in a wine solution and can be used in place of conventional natural wood cork stoppers in wine bottling. The stopper is compatible with cork insertion machinery and can withstand compression without cutting, creasing, or wrinkling. The synthetic stopper is also easily extractable with a typical cork screw, without substantial expansion, crumbling, or disintegration. Further, the stopper retains its resiliency against a bottle wall over time providing a continuous complete seal. Finally, the stopper of the invention may resemble natural wood bark corks and the skin of the synthetic stopper may be printable.

These and other aspects of the invention will become evident upon reference to the following detailed description and attached drawings.

BRIEF DESCRIPTION OF THE DRAWINGS

The features, aspects, and advantages of the invention will become more thoroughly apparent from the following detailed description, appended claims, and accompanying drawings in which:

FIG. 9 illustrates a planar side view of a fiber bundle inserted into a pultrusion apparatus with an elastomer.

FIG. 10 illustrates a planar side view wherein a bundle of fibers travels through the pultrusion apparatus and is brought into contact with the elastomer.

FIG. 11 illustrates a planar side view of the dispersion of the fiber strands throughout the elastomer as the composite stopper rod leaves the pultrusion apparatus.

DETAILED DESCRIPTION OF THE INVENTION

A composite or multicomponent stopper, a method for making the composite stopper, and a method for using the composite stopper to protect liquid in a bottle is described. In the following detailed description, numerous specific details are set forth such as specific materials, forms, and properties, as well as specific methods of manufacture, in order to provide a thorough understanding of the invention. It will be clear to one skilled in the art, however, that these specific details need not be employed to practice the invention.

In one aspect of the invention, there is provided a composite stopper for use in bottle openings that can function as a suitable replacement for natural wood bark cork. Accordingly, the invention features a stopper for use in a substantially cylindrical bottle opening, preferably a wine bottle opening, comprising a synthetic elastomer body having a portion with a substantially cylindrical shape to be disposed in the bottle opening, thereby preventing spillage of the bottle contents and preventing passage of oxygen from the atmosphere to the contents, e.g., wine. The stopper body is not homogeneous. The elastomer body has disposed within it a substantially longitudinally extending fiber portion or portions that provide the stopper with superior compressive properties compared to other synthetic stoppers or natural wood bark corks.

Figure 1:
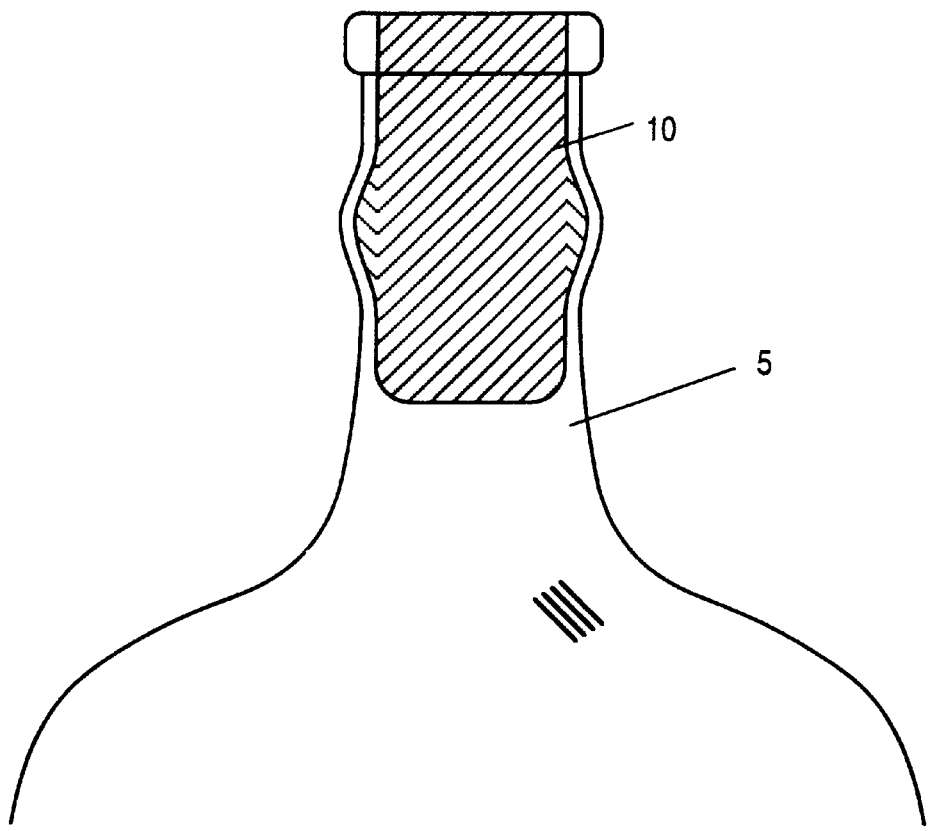
FIG. 1 is a planar side view of a bottle with the composite stopper of the invention inserted in the substantially cylindrical bottle opening.
Figure 2:
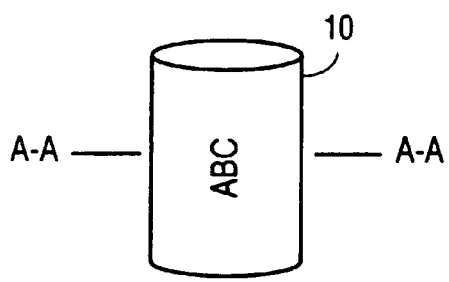
FIG. 2 is a front perspective view of an embodiment of the stopper of the invention illustrating a shape of the stopper body.

FIG. 1 illustrates a planar side view of a bottle 5 with a stopper 10 of the invention inserted in the substantially cylindrical bottle opening of the bottle 5. FIG. 1 illustrates that the stopper 10 functions similarly to natural wood corks to finish wine. FIG. 2 illustrates a perspective view of a contemplated shape of the stopper 10 of the invention. The stopper is formed of a fiber reinforced synthetic elastomer body. FIG. 2 shows an embodiment where letters are printed on the stopper body. The invention contemplates that the stopper can retain printed matter on the surface that contacts the container. In this embodiment, a producer's or manufacturer's name, logo, or other trademark may be displayed on the composite stopper.

The elastomer of the stopper exhibits no interaction with or tainting of bottle contents such as wine. The elastomer also demonstrates a suitable source of compression for improved sealability and long service life. The elastomer may be selected from the polyolefins, the thermoplastic elastomers, ethyl vinyl acetate, polyurethane, silicone, and combinations of copolymers thereof. Contemplated polyolefins include, but are not limited to, the $C_2$–$C_8$ polyolefins and their copolymers, particularly, polyethylene, polypropylene, polybutenes, polyisoprene, and their copolymers, e.g., polyethylene-octene. The thermoplastic elastomers contemplated include, but are not limited to, styrene and polystyrene and their copolymers, including styrene-ethylene-butylene-styrene copolymer, styrene-ethylene-butylene copolymer, styrene-butadiene-styrene copolymer, styrene-butylene copolymer, a styrene-isoprene-styrene copolymer, a styrene-isoprene copolymer, a styrene-ethylene-propylene-styrene copolymer, and a styrene-ethylene-propylene copolymer.

The invention contemplates that the stopper is made of a fiber extending substantially longitudinally through the synthetic elastomer body. The fiber contemplated generally include the natural fibers and the synthetic fibers. Examples of natural fibers include, but are not limited to, animal fibers, cotton, cellulose, and hemp. Examples of synthetic fibers include, but are not limited to, polyesters, polyamides, acrylics, carbon, and glass.

In another embodiment of the invention, the composite stopper is a fiber reinforced elastomer body wherein the elastomer is combined with one or more blowing agents. The combination of a blowing agent with an elastomer is well-known in the plastics processing art. The blowing agent provides cells in the elastomer body which give the composite stopper additional flexibility. Too much blowing agent will generally result in a stopper that has excessively large cells in its interior and is overly spongy. The use of too little blowing agent will result in a stopper that does not have enough interior cells or adequately sized cells and is too hard for the desired sealing properties required and for the routine removal of the stopper from a wine bottle by conventional a cork screw. The blowing agent is generally present in an amount less than 10% of the total elastomer composition, and preferably is in the range from about 1% to about 3% of the elastomer composition. Of course, the precise amount of blowing agent may be determined by one skilled in the art taking into account the precise elastomer, blowing agent, and other ingredients used, as well as the molding conditions.

In a preferred embodiment, the blowing agent is BIF40, commercially available from BI Chemicals, Montclair, N.J. Another blowing agent is Spectratech™ FM1150H, which is commercially available from Quantum Chemical Corp., USI Division, Cincinnati, Ohio. Other suitable blowing agents include, but are not limited to, azodicarbonamide, zodecarbonoxide, sodium bicarbonate, and sodium metabisulfate.

The properties of the stopper body associated with the blowing agent can also be obtained by the use of direct pressurization of the elastomer in the mold or extruder barrel by, for example, nitrogen, CFC's, $CO_2$, or sulfur hexafluorides. Cell formation is assisted by the presence of nucleating agents such as talc or CELOGEN (commercially available from Uniroyal Chemical, Middlebury, Conn.).

Powder or liquid pigments may be added to the mixture of the elastomer and, optionally, blowing agents, to give the composite stopper a desired color or tint. The powder or liquid pigments generally constitute less than 1% of the total composition. Other additives may also be included to impart various desired properties. These additives include hardening or crosslinking agents, surfactants, and viscosity modifiers.

In yet another embodiment, a lubricant such as a fatty acid, a silicone, an alcohol, or water (including mineral water) is added before or after the molding. The lubricant facilitates the stop sertion and removal of the composite stopper from the bottle opening. Preferably, the lubricant is a fatty acid and comprises less than about 0.5% of the total composition.

One embodiment of the composite stopper provides that the elastomer of the stopper surrounds a contiguous fiber plug. This is accomplished by placing a plug of a preferably porous, fibrous substance, e.g., cotton or polyester, in a mold or similar cavity. The mold or cavity is sized to produce a properly sized stopper. The plug of fiber is sized slightly smaller than the mold cavity. In the embodiment wherein the fiber plug is cotton or polyester, the cotton or polyester is preferably made from fiber mats of a density of 0.3–1.0 g/cc. A synthetic elastomer is then injected into the cavity to form a skin around the entire plug, including the plug ends. In the preferred embodiments, the fiber plug is porous and is low in material cost. The porous nature of the fiber plug allows the elastomer to significantly penetrate the fiber plug. By controlling the density of the plug, the stiffness of the elastomer, the degree of penetration of the elastomer into the plug, and the stiffness of the fibers in the plug, closures with varying compressibility characteristics may be obtained.

It is desirable that the closure be more compressible on its outer periphery than in its center in order to prevent wrinkling of the closure surface during the insertion into the bottle. Thus, a resilient foam polymer is injected to surround a less resilient, dense fiber mat. The control of the plug density by the diameter and method of packing the fibers is well known. Outer foam resiliency is controlled by the degree of foaming and the nature of the polymer resin used.

In a preferred embodiment, the fiber plug has a cylindrical shape. However, the invention contemplates that other geometries can be used. For example, plugs may have a square, an octagonal, or a star-shaped cross section. In addition, a set of substantially longitudinally oriented strips of fiber mat may be used as well as a fiber plug with axial holes for added porosity are contemplated.

Figure 3:
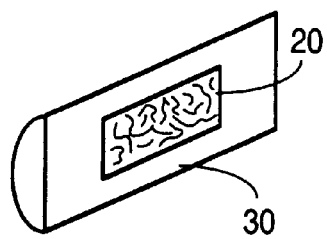
FIG. 3 is a perspective cut-away view of the stopper shape of FIG. 2 illustrating an embodiment of the invention wherein the composite stopper includes a porous fiber core surrounded by an elastomer skin.
Figure 4:
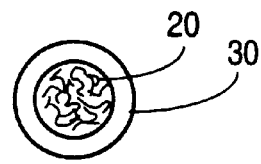
FIG. 4 is a planar side view of the stopper shape of FIG. 2 taken through line A—A and illustrates an embodiment of the invention wherein the stopper includes a porous fiber core surrounded by an elastomer skin.

FIG. 3 presents a perspective cut-away view of the stopper shape of FIG. 2. FIG. 3 shows a plug of a porous fiber 20 with a cylindrical shape completely surrounded by an elastomer 30. FIG. 4 shows a planar cross-sectional view through line A—A of FIG. 2. FIG. 4 shows the cylindrical fiber plug 20 surrounded by an elastomer skin 30. In the preferred embodiment, the elastomer 30 is thoroughly mixed with a blowing agent and the mixture is added to the mold. The plug 20 provides a strong matrix for the elastomer 30 and also serves as a cavitation center causing the foaming associated with the elastomer/blowing agent mixture to be well-dispersed throughout the stopper.

In one example of this embodiment, a medical-grade compressed cotton cylindrical rod with dimensions of 1 cm diameter and 3 cm length and generally intended for feminine hygiene use is inserted into a mold cavity. The plug is held in place with a plastic or cellulose pin. A low viscosity elastomer (for example, Affinity SM1350, Dow Plastics, Midland, Mich.) containing 1.5% blowing agent (Celazole Ariz., Uniroyal Chemical, Middlebury, Conn.) is injected into the mold using a standard hot-runner pressurized mold system. The mold is articulated in such a manner that the plug is held in its center as the resin is injected. The resulting molded article has the center plug completely encapsulated by the resilient, nonabsorptive foamed polymer.

Figure 5:
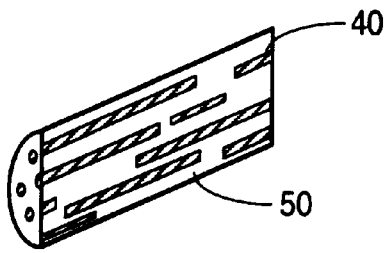
FIG. 5 is a perspective cut-away view of the stopper shape of FIG. 2 and illustrates an embodiment of the invention wherein the stopper includes a plurality of fiber strands dispersed throughout an elastomer.
Figure 6:
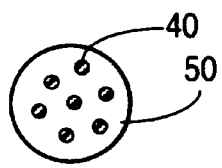
FIG. 6 is a planar side view of the stopper shape of FIG. 2 taken through line A—A and illustrates an embodiment wherein the stopper includes a plurality of fiber strands dispersed throughout an elastomer.
Figure 10:
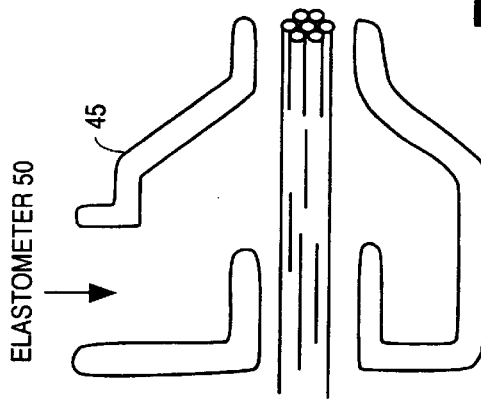
FIGS. 9–11 illustrate a method of forming the composite stopper of the invention, specifically the embodiment wherein a plurality of fiber strands are dispersed throughout the elastomer.
Figure 9:
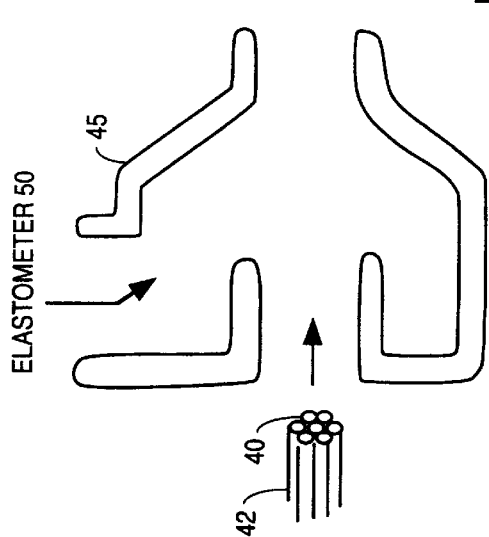
Figure 11:
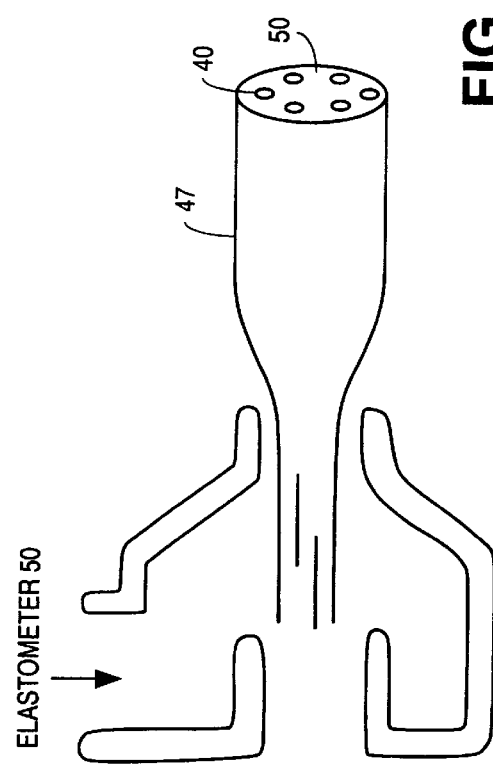

Another embodiment of the invention contemplates that fiber strands are dispersed substantially longitudinally in the elastomer throughout the stopper body. FIG. 5 illustrates a perspective cut-away view of the stopper shape of FIG. 2 and shows the embodiment wherein fiber strands 40 are dispersed throughout the elastomer 50. FIG. 6 presents a planar cross-sectional view of the stopper shape of FIG. 2 through line A—A wherein the embodiment includes fiber strands 40 dispersed throughout the elastomer 50. As can be seen from both FIGS. 5 and 6, the fiber strands 40 are dispersed randomly throughout the stopper. This dispersion is accomplished by drawing a fiber tow through a pultrusion apparatus or a cross-head extrusion/coating die. FIGS. 9–11 demonstrate this process. In this particular embodiment demonstrated, a bundle or tow 42 of unwoven fibers 40, preferably 0.001–0.002" diameter polyester fibers with a total tow diameter of 0.5", are drawn through a cross-head extrusion die 45. An elastomer 50 containing a blowing agent and other additives is injected into the die and penetrates the tow. Upon exiting the die, the elastomer/blowing agent expands to its final shape producing a rod-like structure 47 with fibers 40 dispersed throughout (FIG. 11). The resultant rod 47 is then cut into appropriate length synthetic stoppers. Fibrous strands may be at the surface of the stopper ends. Where the embodiment uses a hydrophobic synthetic fiber, the invention contemplates that the ends can be left as is since no moisture can penetrate the fibers and penetrate through the stopper. Alternatively and optionally, the ends are sealed using hot air, silicone hot-stamping, ultrasonics, or similar technique. The sealing of the ends is particularly important where a natural fiber like cotton is used, because the natural fiber may permit moisture or oxygen to penetrate the stopper. Once the stopper is formed, the stopper may optionally be further modified, for example, vulcanized, surface-treated, etc.

In a preferred embodiment, a 0.5" diameter polyester fiber tow (Dacron, Dupont Fibers, Wilmington, Del.) is pulled through a cross-head die (Genca, Clearwater, Fla.). The elastomer injected into the crosshead is a flowable food-grade elastomer (Affinity SM1350, Dow Plastics, Midland, Mich.) containing gas generated by a blowing agent (Celazole AZ, Uniroyal Chemical, Middlebury, Conn.) added at 1.5% by weight. Typical process temperatures are about 350–400° F. The die head temperature is at a lower temperature but above the melting point of the polymer, preferably 250° F. The resulting foamed, fiber-reinforced rod may be cut into lengths suitable for use as a stopper. Because of the compatibility between the elastomer and the fiber tow, no further end finishing is usually necessary.

Another embodiment may be realized by performing the cross-head extrusion at a temperature above the melting point of the polymer but below the activation temperature of the blowing agent. The resulting unfoamed rod may then be radiation cross-linked, then heated above the activation temperature of the blowing agent to form a foamed rod, which can then be cut into suitable lengths. For example, the composition given in the previous example is processed at 250–260° F. The resultant solid rod containing the chemical blowing agent is cross-linked by standard E-beam or gamma radiation to a gel point of 50% as measured by xylene soak testing. The rod is then heated to 350–400° F., whereupon the cross-linked resin softens and the blowing agent activates and the rod expands to size. The resulting foamed fiber-reinforced rod may be cut to length.

Figure 7:
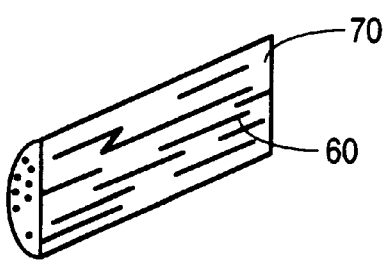
FIG. 7 is a perspective cut-away view of a stopper shape of FIG. 2 and illustrates an embodiment of the invention wherein the stopper includes a liquid crystal polymer surrounded an elastomer.
Figure 8:
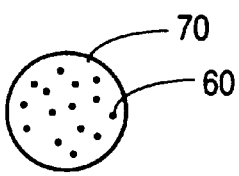
FIG. 8 illustrates a planar side view of the stopper shape of FIG. 2 taken through lines A—A and illustrates an embodiment of the invention wherein the stopper includes a liquid crystal polymer surrounded by an elastomer.

Another embodiment, illustrated in FIGS. 7 and 8, contemplates that the fibrous support system of the stopper body is provided by a liquid crystal polymer (LCP). In this embodiment, distinct polymers, i.e., an LCP and a synthetic elastomer, are blended together, preferably with a blowing agent, then extruded with the use of a conventional extrusion die to produce a stopper rod. The LCP strongly orients itself in the direction of extrusion (i.e., along the longitudinal axis of the resulting extruded rod) and remains as a distinct phase from the elastomer matrix, forming a microfibrous structure within the rod. FIG. 7 shows a perspective cut-away view of the stopper shape of FIG. 2 and wherein the microfibrons LCP structures 60 are surrounded by an elastomer 70. FIG. 8 presents a planar cross-sectional view of this embodiment.

In the preferred embodiment, the base elastomer is Dow Affinity SE1400, commercially available from Dow Plastics, Midland, Michigan, and the LCP is an aromatic liquid crystal thermoplastic polyester sold under the trade name VECTRA by Hoechst-Celanese Corporation. The elastomer and the LCP are mixed in a ratio of 9:1. Preferred alternative ratios of the polymers are contemplated between 5:1 and 20:1 by weight. The polymers are physically blended then a blowing agent is added, preferably BIF40 commercially available from BI Chemicals, Montclair, N.J. The blowing agent represents preferably about 2% by weight of the polymer mixture. The mixture is loaded into a hopper of an extruder with a 32:1 L/D screw. Processing occurs at approximately 480–500° F. Toward the die end of the extruder following the screen-pack, the melt temperature is lowered to the point where the LCP solidifies within the still-molten elastomer resin, forming an integral fibrous structure. The extruder produces a rod-like structure with an appropriate stopper diameter that may be cut into the desired stopper length. Once again, the ends may or may not be optionally sealed, since the moisture or air will not be able to penetrate the LCP-elastomer stopper body.

The composite stopper described in each of the above embodiments of the invention is inert in wine and other food products and will not absorb gases or other components from the bottle contents or the head space within the wine bottle between the stopper and the contents. The stopper will also not allow significant amounts of air to reach the interior of the bottle. The stopper may be used over an extended period as, for example, in accordance with the desired aging properties of many wines. The stopper resists reaction or solvation in alcohol, acid, or base and does not taint the wine with any chemical or smell.

The composite stopper of the invention is compatible with cork insertion machinery. The invention contemplates that either the density or elasticity of the stopper is similar throughout the stopper body or has an outer portion with a lower density or higher resiliency than its core. Thus, the stopper can withstand the compression of the machinery without cutting, creasing, or wrinkling.

The composite stopper of the invention seals the standard wine bottle and permits the wine bottle to be stored immediately in any position, including on the bottle's side or inverted. The sealing properties of the composite stopper allow it to withstand typical bottle head space pressure changes. For example, wines are often bottled at approximately 50–55° F. but can be exposed to 80°–100° F. during shipping and storage. This temperature change can create head space pressure changes in the bottles. The sealing properties of the composite stopper of the invention can withstand such head space pressure changes. Further, many wines are bottled with a slight "fizz" of $CO_2$ that can remain in the bottle after the stopper is installed in the bottle opening. The stopper of the invention can withstand head space pressure changes due to residual $CO_2$ in the bottle.

The composite stopper of the invention is easily extractable with conventional cork screws. The stopper can be removed with a conventional cork screw without substantial expansion, crumbling, or disintegration.

The composite stopper of the invention retains its resiliency against the bottle wall over time thus maintaining the same seal as when bottled. This allows wines to be aged for many years without being exposed to environmental oxygen.

Preferably, the composite stopper of the invention resembles natural wood bark although other colors are contemplated. Further, the stopper is printable to allow a company's name or logo to be imprinted on the side of the stopper.

In the preceding detailed description, the invention is described with reference to specific exemplary embodiments thereof. It will, however, be evident that various modifications and changes may be made thereto without departing from the broader spirit and scope of the invention as set forth in the claims. The specification and figures are, accordingly, to be regarded in an illustrative rather than a restrictive sense.

What is claimed is:

1. A stopper comprising:
   a synthetic elastomer body; and
   a fiber portion disposed in a longitudinal direction through a length of the elastomer body,
   wherein the stopper is adapted to conform to and seal an opening in a bottle neck.

2. The stopper of claim 1, wherein the body further comprises a blowing agent.

3. The stopper of claim 1, wherein the fiber portion is one of a natural fiber and a synthetic fiber.

4. The stopper of claim 3, wherein the fiber portion is one of cotton and polyester.

5. The stopper of claim 1, wherein the elastomer is one of the polyolefins, the monomeric and polymeric styrenes, ethyl vinyl acetate, polyurethane, silicone, and combinations thereof.

6. The stopper of claim 5, wherein the elastomer is one of a $C_2$–$C_8$ polyolefin and its copolymers.

7. The stopper of claim 1, wherein the fiber portion is porous.

8. The stopper of claim 1, wherein a plurality of fiber portions are dispersed substantially longitudinally throughout the elastomer body.

9. The stopper of claim 8, wherein the fiber portions are porous.

10. A stopper comprising a body of a liquid crystal polymer and a synthetic thermoplastic elastomer and adapted to conform to and seal an opening in a bottle neck.

11. The stopper of claim 10, wherein the body further comprises a blowing agent.

12. The stopper of claim 10, wherein the elastomer is one of the polyolefins, the thermoplastic elastomers, ethyl vinyl acetate, polyurethane, silicone, and combinations thereof.

13. The stopper of claim 12, wherein the elastomer is one of a $C_2$–$C_8$ polyolefin and its copolymers.

14. The stopper of claim 10, wherein the liquid crystal polymer is an aromatic liquid crystal thermoplastic polyester.

15. The stopper of claim 10, wherein the ratio of elastomer to liquid crystal polymer is between five to one and 20 to one.

16. The stopper of claim 10, further comprising a blowing agent.

17. The stopper of claim 1, wherein the fiber portion is comprised of a plurality of fibers of similar lengths.

18. The stopper of claim 1, wherein the fiber portion is a porous fiber plug.

* * * * *